(12) United States Patent
Jung et al.

(10) Patent No.: US 11,831,046 B2
(45) Date of Patent: Nov. 28, 2023

(54) SYSTEM AND METHOD FOR CONTROLLING FUEL SUPPLY FOR FUEL CELL

(71) Applicants: HYUNDAI MOTOR COMPANY, Seoul (KR); KIA CORPORATION, Seoul (KR)

(72) Inventors: Jae Won Jung, Suwon-si (KR); Sang Wook Han, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/474,024

(22) Filed: Sep. 13, 2021

(65) Prior Publication Data

US 2022/0200023 A1 Jun. 23, 2022

(30) Foreign Application Priority Data

Dec. 17, 2020 (KR) ........................ 10-2020-0177688

(51) Int. Cl.
*H01M 8/04* (2016.01)
*H01M 8/04089* (2016.01)
*H01M 8/04992* (2016.01)
*H01M 8/04746* (2016.01)

(52) U.S. Cl.
CPC ... *H01M 8/04104* (2013.01); *H01M 8/04753* (2013.01); *H01M 8/04992* (2013.01)

(58) Field of Classification Search
CPC ......... H01M 8/04104; H01M 8/04753; H01M 8/04992
See application file for complete search history.

(56) References Cited

U.S. PATENT DOCUMENTS

2007/0015014 A1* 1/2007 Kurosaki .......... H01M 8/04425
429/513
2017/0179511 A1* 6/2017 Jung ................. H01M 8/04686

FOREIGN PATENT DOCUMENTS

KR 101459815 B1 11/2014

* cited by examiner

*Primary Examiner* — Olatunji A Godo
(74) *Attorney, Agent, or Firm* — MCDONNELL BOEHNEN HULBERT & BERGHOFF LLP

(57) ABSTRACT

Disclosed are a system and a method for fuel supply control for a fuel cell. The system includes a fuel supply line, a fuel supply valve, a base duty calculator configured to estimate a required supply amount of a fuel gas required for the fuel supply line on the basis of a power generation state of the fuel cell and to calculate a base duty instruction to open the fuel supply valve on the basis of the estimated required supply amount, and a valve controller.

13 Claims, 5 Drawing Sheets

SYSTEM AND METHOD FOR CONTROLLING FUEL SUPPLY FOR FUEL CELL

CROSS REFERENCE TO RELATED APPLICATION

The present application claims priority to Korean Patent Application No. 10-2020-0177688, filed Dec. 17, 2020, the entire contents of which is incorporated herein for all purposes by this reference

BACKGROUND

1. Field

The present disclosure relates to a system and a method for controlling fuel supply for a fuel cell and, more particularly, to a technology for supplying hydrogen such that an appropriate pressure is maintained in a hydrogen supply line.

2. Description of the Prior Art

A fuel cell is a kind of power generation device configured to directly convert chemical energy resulting from oxidation of fuel into electric energy. The fuel cell is similar to a chemical cell in that an oxidation/reduction reaction is utilized, but is different from the chemical cell, in which a cell reaction proceeds within a closed system, in that reaction materials are continuously supplied from the outside, and reaction resultants are continuously removed of the system. Fuel cell power generation systems have recently been put to practical use, and there has been extensive research to use the same as eco-friendly vehicle energy sources because the reaction resultants in fuel cells are pure water.

A fuel cell system includes a fuel cell stack for generating electric energy through a chemical reaction, an air supply device for supplying air to the air electrode of the fuel cell stack, and a fuel supply device for supplying fuel to the hydrogen electrode of the fuel cell stack. That is, air including oxygen is supplied to the air electrode (cathode) of the fuel cell stack, and hydrogen is supplied to the hydrogen electrode (anode) of the fuel cell stack.

Hydrogen is supplied to the hydrogen electrode of the fuel cell stack through a hydrogen supply line, and high-concentration hydrogen is supplied from a hydrogen tank to the hydrogen supply line such that hydrogen including impurities is discharged through purging, thereby maintaining the hydrogen concentration.

Traditionally, the flow rate of hydrogen supplied to the hydrogen supply line is controlled through PWM duty control of a hydrogen supply valve. Particularly, the PWM duty of the hydrogen supply valve is controlled through PI control so as to follow a target pressure according to the output current of the fuel cell.

However, this configuration and method has a problem in that the target pressure increases during high-output (high-current) operation of a fuel cell, thereby increasing the duty instruction amplitude of the hydrogen supply valve, and a control overshoot occurs when a disturbance occurs (for example, when the purge valve is opened).

The above descriptions regarding the background are only to facilitate understanding of the background of the present disclosure, and are not to be considered by a person skilled in the art as corresponding to already-known prior arts.

SUMMARY

The present disclosure has been proposed to solve the above-mentioned issues, and it is an aspect of the present disclosure to provide a technology for controlling hydrogen supply, in connection with a fuel cell, by using a base duty instruction for a hydrogen supply valve according to a hydrogen flow rate required by a hydrogen supply line, and a feedback duty instruction for correcting incurred errors.

A fuel supply control system for a fuel cell according to an aspect of the present disclosure includes: a fuel cell configured to be separably supplied with a fuel gas and an oxidizing gas and to generate power, a fuel supply line configured to circulate a gas including a fuel gas therein and connected to an anode of the fuel cell, a fuel supply valve disposed between a fuel tank keeping a fuel gas therein and the fuel supply line and configured to allow the fuel gas in the fuel tank to be supplied to the fuel supply line when being opened, a base duty calculator configured to estimate a required supply amount of a fuel gas required for the fuel supply line based on a power generation state of the fuel cell and to calculate a base duty instruction to open the fuel supply valve based on the estimated required supply amount, and a valve controller configured to control opening and closing of the fuel supply valve based on the base duty instruction calculated by the base duty calculator.

The base duty calculator may estimate the required supply amount of a fuel gas based on the amount of a fuel gas that is consumed by the fuel cell and an added amount according to a pressure change of the fuel supply line.

The base duty calculator may calculate the amount of a fuel gas that is consumed by the fuel cell as the amount of hydrogen required to generate an output current or a required current of the fuel cell.

The base duty calculator may calculate the added amount according to a pressure change of the fuel supply line as the amount of hydrogen required to follow a target pressure at a present pressure of the fuel supply line based on temperature and volume of the fuel supply line.

The fuel supply control system may further include a purge valve disposed in the fuel supply line and configured to allow the fuel gas in the fuel supply line to be discharged outside. The base duty calculator may estimate the required supply amount of a fuel gas based on an exhaust amount of a fuel gas, which is discharged outside from the fuel supply line, calculated based on a pressure difference between the fuel supply line and the outside when the purge valve is opened or is expected to be opened.

The fuel supply control system may further include a feedback duty calculator configured to calculate a feedback duty instruction to compensate for a difference between a current pressure and a target pressure of the fuel supply line. The valve controller may control opening and closing of the fuel supply valve based on the base duty instruction calculated by the base duty calculator and the feedback duty instruction calculated by the feedback duty calculator.

The feedback duty calculator may calculate a feedback duty instruction to perform proportional integral control (PI control) on the difference between the current pressure and the target pressure of the fuel supply line.

The base duty calculator may determine whether it is possible to calculate the base duty instruction based on whether it is possible to acquire power generation state data of the fuel cell or state data of the fuel supply line. The feedback duty calculator may calculate the feedback duty instruction by applying different control gain values, depending on whether it is possible to calculate the base duty instruction.

The feedback duty calculator may apply a relatively small control gain value when the base duty instruction can be calculated rather than when the base duty instruction cannot be calculated.

The valve controller may control opening and closing of the fuel supply valve while limiting the sum of the base duty instruction calculated by the base duty calculator and the feedback duty instruction calculated by the feedback duty calculator within a predetermined duty limit range.

A fuel supply control method for a fuel cell according to an aspect of the present disclosure includes: estimating a required supply amount of a fuel gas required for a fuel supply line connected to an anode of a fuel cell based on a power generation state of the fuel cell; calculating a base duty instruction to open a fuel supply valve, which allows a fuel gas kept in a fuel tank to be supplied to the fuel supply line when being opened, based on the estimated required supply amount; and controlling opening and closing of the fuel supply valve based on the calculated base duty instruction.

In the calculating of a base duty instruction, the required supply amount of a fuel gas may be estimated based on the amount of a fuel gas that is consumed by the fuel cell and an added amount according to a pressure change of the fuel supply line.

The fuel supply control method may further include estimating whether a purge valve, which allows a fuel gas in the fuel supply line to be discharged outside when being opened, is open or is expected to be opened, before the estimating of a required supply amount of a fuel gas. In the estimating of a required supply amount of a fuel gas, the required supply amount of a fuel gas may be estimated based on an exhaust amount of a fuel gas, which is discharged outside from fuel supply line, calculated based on a pressure difference between the fuel supply line and the outside when the purge valve is open or is expected to be opened.

The fuel supply control method may further include calculating a feedback duty instruction to compensate for a difference between a current pressure and a target pressure of the fuel supply line, before the controlling of opening and closing of the fuel supply valve. In the controlling of opening and closing of the fuel supply valve, opening and closing of the fuel supply valve may be controlled based on the calculated base duty instruction and feedback duty instruction.

The fuel supply control method may further include determining whether it is possible to calculate the base duty instruction based on whether it is possible to acquire power generation state data of the fuel cell or state data of the fuel supply line, before the calculating of a feedback duty instruction. In the calculating of a feedback duty instruction, the feedback duty instruction may be calculated by applying different control gain values, depending on whether it is possible to calculate the base duty instruction.

According to the present disclosure, a substantial decrease in the amplitude that is changed when the pressure of the fuel supply line follows the target pressure can be identified. In addition, an overshoot that is a large rise of the pressure of the fuel supply line is not generated even in the purge period in which the purge valve is opened.

That is, the present disclosure is advantageous in that the pressure of the fuel supply line follows the target pressure while exhibiting a substantially improved following performance.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
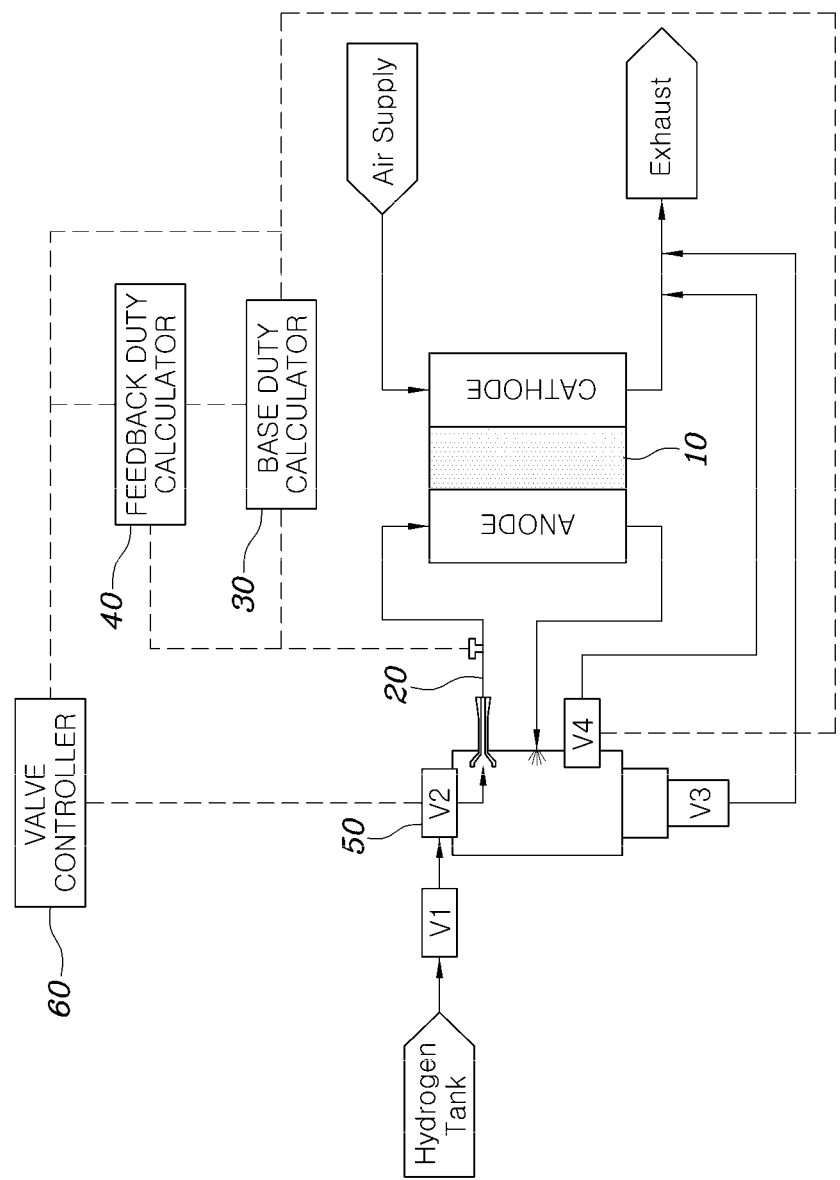
FIG. 1 is a configuration diagram of a fuel supply control system for a fuel cell according to an embodiment of the present disclosure.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood not only that the element is directly connected or accessed to the other elements, but also that another element may exist between them. Contrarily, in the case where a component is referred to as being "directly connected" or "directly accessed" to any other component, it should be understood that there is no component therebetween. The other expressions of describing a relation between structural elements, i.e. "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, exemplary embodiments of the present disclosure will be described in detail with reference to the accompanying drawings. The same or like reference signs presented in the drawings designate the same or like elements.

Figure 2:
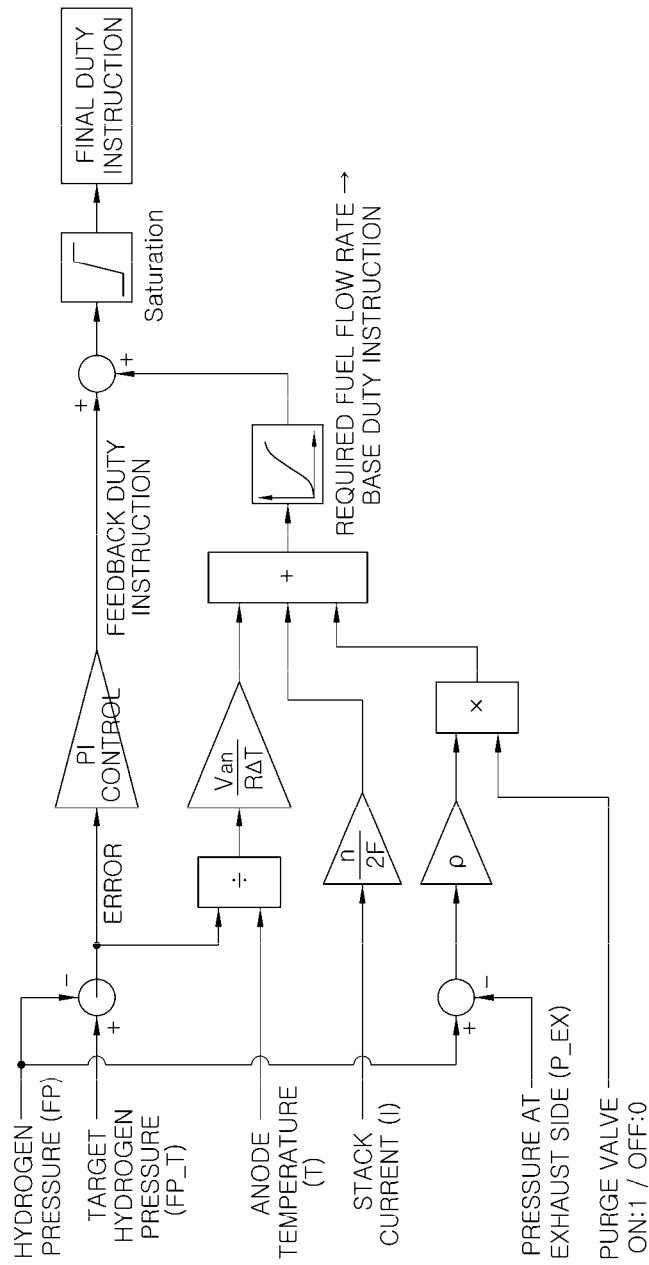
FIG. 2 is a control diagram of the fuel supply control system for a fuel cell according to an embodiment of the present disclosure.

FIG. 1 is a configuration diagram of a fuel supply control system for a fuel cell 10 according to an embodiment of the present disclosure, and FIG. 2 is a control diagram of the fuel supply control system for a fuel cell 10 according to an embodiment of the present disclosure.

Referring to FIGS. 1 and 2, a fuel supply control system for a fuel cell 10 according to an embodiment of the present disclosure includes: a fuel cell 10 being separably supplied with a fuel gas and oxidizing gas and generating power, a fuel supply line 20 circulating a gas including the fuel gas therein and connected to an anode of the fuel cell 10, a fuel supply valve 50 disposed between a fuel tank keeping a fuel gas therein and the fuel supply line 20 and allowing the fuel gas in the fuel tank to be supplied to the fuel supply line 20 when being opened, a base duty calculator 30 estimating a required supply amount of a fuel gas required for the fuel supply line 20 based on a power generation state of the fuel cell 10 and calculating a base duty instruction BS to open the fuel supply valve 50 based on the estimated required supply amount, and a valve controller 60 controlling opening and closing of the fuel supply valve 50 based on the base duty instruction BS calculated by the base duty calculator 30.

The base duty calculator 30, a feedback duty calculator 40, and the valve controller 60 according to an embodiment of the present disclosure can be implemented through a nonvolatile memory (not shown) configured to store algorithms for controlling operation of various components of a vehicle or data about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

The fuel cell 10 is supplied with a fuel gas through the anode and an oxidizing gas through the cathode, thereby generating power. The fuel cell 10 may be a fuel cell stack composed of a plurality of stacked cells. In one example embodiment, the fuel gas is hydrogen, the oxidizing gas is oxygen, and the fuel cell can be supplied with air including oxygen.

The anode of the fuel cell 10 may be connected to the fuel supply line 20 and may be supplied with gas including hydrogen that flows to the fuel supply line 20. In particular, the fuel supply line 20 can supply the gas including hydrogen discharged from an anode outlet of the fuel cell 10 back to an anode inlet of the fuel cell 10 by re-circulating the gas.

The fuel supply valve 50 is connected to the fuel supply line 20 through an ejector and circulation can be induced through the fuel supply line 20 by high-pressure hydrogen gas that is supplied through the ejector from a fuel tank.

The fuel supply valve 50 may be disposed between the fuel tank and the fuel supply line 20 and can be opened such that the fuel gas kept in the fuel tank is supplied to the fuel supply line 20. The supply amount of a fuel gas can be adjusted by controlling the degree the fuel supply valve 50 opens and the supply amount can be adjusted by a PWM duty instruction.

A Fuel Blocking Valve (FBV) other than the Fuel Supply Valve (FSV) 50 may be further disposed between the fuel tank and the fuel supply line 20. The fuel blocking valve, which is a valve of which only on/off is controlled, may be opened when the fuel cell system 10 is turned on and may be closed when the fuel cell system is turned off.

The base duty calculator 30 can estimate the required supply amount of a fuel gas required for the fuel supply line 20 based on the power generation state of the fuel cell 10. Specifically, the base duty calculator 30 can estimate the required supply amount of a fuel gas based on of whether the power generation state of the fuel cell 10 is a high-power (high-current) operation state or a low-power (low-current) operation state.

In one example embodiment, since the larger the output current of the fuel cell 10 the higher the target pressure of the fuel supply line 20 and the larger the amount of fuel gas that is consumed in the fuel supply line 20, the base duty calculator 30 can estimate a large required supply amount of a fuel gas.

The base duty calculator 30 can calculate a base duty instruction (BS) to open the fuel supply valve 50 based on the estimated required supply amount. The base duty instruction (BS) may be a duty ratio for opening the fuel supply valve 50 to supply the estimated required supply amount to the fuel supply line 20.

In one example embodiment, a duty ratio according to a supply flow rate may be mapped or stored in advance, depending on the design of the fuel supply valve 50, etc. The base duty calculator 30 can calculate a base duty instruction (13S) according to the estimated required supply amount based on the pre-mapped or pre-stored duty ratio according to a supply flow rate.

The valve controller 60 can control opening and closing of the fuel supply valve 50 in accordance with the base duty instruction (BS). Specifically, the valve controller 60 can control the fuel supply valve 50 such that the fuel supply valve 50 is opened and closed, in accordance with the duty ratio according to the base duty instruction (13S).

Therefore, there is an effect that a control amplitude controlling the pressure of the fuel supply line 20 when the fuel cell 10 outputs high power is increased or a control overshoot controlling the pressure of the fuel supply line 20 in purge controlling is improved by calculating the base duty instruction (BS) for control based on the amount of fuel in the fuel supply line 20.

The base duty calculator 30 can estimate the required supply amount of a fuel gas based on the amount of a fuel gas that is consumed by the fuel cell 10 and an added amount according to a pressure change of the fuel supply line 20.

In further detail, the base duty calculator 30 can calculate the amount of a fuel gas that is consumed by the fuel cell 10 as the amount of hydrogen required to generate an output current or a required current of the fuel cell 10.

In one example embodiment, the base duty calculator 30 can calculate a consumed amount of a fuel gas using the following equation.

$$\text{consumption amount [mol/s]} = \frac{(I \times n)}{2F}$$

where I is the current (measured value) of the fuel cell 10, n is the number of cells (designed value) of the fuel cell 10, and F is the Faraday coefficient.

The base duty calculator 30 can calculate the added amount according to a pressure change of the fuel supply line 20 as the amount of hydrogen required to follow a target pressure at the present pressure of the fuel supply line 20 based on the temperature and volume of the fuel supply line 20.

In one example embodiment, the base duty calculator 30 can calculate the added amount of a fuel gas using the following equation according to the equation of state for an ideal gas (PV=nRT).

$$\text{added amount [mol/s]} = \frac{(FP_T - FP)V_{an}}{RT\Delta t}$$

where FP is the current pressure (measured value), $FP_T$ is a target pressure, $V_{an}$ is the internal volume (designed value) of the fuel supply line 20, R is an ideal gas constant, T is the temperature of the fuel supply line 20, and $\Delta t$ is a control calculation cycle (fixed value).

The fuel supply control system further includes a purge valve disposed in the fuel supply line 20 and allowing the fuel gas in the fuel supply line 20 to be discharged outside. The base duty calculator 30 can estimate a required supply amount of a fuel gas based on the exhaust amount of a fuel gas, which is discharged outside from fuel supply line 20, calculated based on the pressure difference between the fuel supply line 20 and the outside when the purge valve is opened or is expected to be opened.

The purge valve is disposed in the fuel supply line 20 and can discharge gas including hydrogen that is circulated in the fuel supply line 20 to the outside. In one example embodiment, the purge valve may be separately provided to purge the gas in the fuel supply line 20 or may be integrated with a drain valve that discharges condensate water flowing in the fuel supply line 20.

In particular, the purge valve is positioned at the outlet of the fuel cell 10 in the circulation direction of gas in the fuel supply line 20 and can discharge the gas in the fuel supply line 20, which is discharged from the fuel cell 10 and contains a relatively large amount of impurities, to the outside.

The base duty calculator 30 can estimate the amount of a fuel gas that is discharged outside from the fuel supply line 20 based on the pressure difference between the fuel supply line 20 and the outside. In one example embodiment, the base duty calculator 30 can estimate the exhaust amount of a fuel gas due to purge using the following equation.

$$\text{exhaust amount [mol/s]} = \rho(FP - P_{EX})$$

where ρ is a purge amount coefficient (experimentally measured value), FP is the current pressure (measured value) of the fuel supply line 20, and $P_{EX}$ is the pressure at an exhaust side (measured value or atmospheric pressure or estimated value)

The base duty calculator 30 can additionally calculate a cross-over amount that is the amount of hydrogen moving to the cathode from the anode through an MEA and can calculate the required supply amount of a fuel gas based on the calculated cross-over amount.

That is, the base duty calculator 30 can estimate the required supply amount of a fuel gas as the sum of a consumed amount and an added amount when the purge valve is closed as follows.

$$\text{required supply amount [mol/s]} = \frac{(FP_T - FP)V_{an}}{RT\Delta t} + \frac{(I \times n)}{2F}$$

Further, the base duty calculator 30 can estimate the required supply amount of a fuel gas as the sum of a consumed amount, an added amount, and an exhaust amount when the purge valve is opened or is expected to be opened as follows.

$$\text{required supply amount [mol/s]} = \frac{(FP_T - FP)V_{an}}{RT\Delta t} + \rho(FP - P_{EX})$$

The fuel supply control system further includes a feedback duty calculator 40 that calculates a feedback duty instruction (FB) to compensate for the difference between the current pressure (FP) and the target pressure ($FP_T$) of the fuel supply line 20. The valve controller 60 can control opening and closing of the fuel supply valve 50 based on the base duty instruction (BS) calculated by the base duty calculator 30 and the feedback duty instruction (FB) calculated by the feedback duty calculator 40.

The feedback duty calculator 40 can calculate a feedback duty instruction (FB) to compensate for the difference between the current pressure (FP) that is a measured value of the fuel supply line 20 and the target pressure $FP_T$ calculated based on a power generation current or a required current of the fuel cell 10.

In one example embodiment, the feedback duty calculator 40 can calculate a feedback duty instruction (FB) to perform proportional integral control (PI control) on the difference between the current pressure and the target pressure of the fuel supply line 20.

In another example embodiment, it may be possible to calculate a feedback duty using proportional control (P control), proportional integral derivative control (PID control), etc.

In one example embodiment, the base duty calculator 30 can determine whether it is possible to calculate a base duty instruction (BS) based on whether it is possible to acquire power generation state data of the fuel cell 10 or state data of the fuel supply line 20. The feedback duty calculator 40 can calculate a feedback duty instruction (FB) by applying different control gain values, depending on whether it is possible to calculate a base duty instruction (BS).

In further detail, the base duty calculator 30 can determine whether it is possible to calculate a base duty instruction (BS) based on whether it is possible to acquire power generation state data of the fuel cell 10 or state data of the fuel supply line 20.

In one example embodiment, when it is impossible to acquire the power generation state data of the fuel cell 10 including the power current or the required current of the fuel cell 10 or it is impossible to acquire the state data of the fuel supply line 20 including the pressure, temperature, etc. of the fuel supply line 20, the base duty calculator 30 can determine that it is impossible to calculate a base duty instruction (BS).

In detail, the feedback duty calculator 40 can calculate a feedback duty instruction (FB) using the following equation when it is possible to calculate a base duty instruction (BS).

$$FB=K1e+I1\int(e)dt$$

where K1 is a proportional control gain, I1 is an integral control gain, and e is the difference between the current pressure (FP) and the target pressure ($FP_T$) of the fuel supply line 20.

In one example embodiment, the final duty instruction that is given to the valve controller 60 to control the fuel supply valve 50 can be calculated as the sum of a base duty instruction (BS) and a feedback duty instruction (FB) (D=BS+FB).

The feedback duty calculator 40 can calculate a feedback duty instruction (FB) using the following equation when it is impossible to calculate a base duty instruction (BS).

$$FB=K2e+I2j(e)dt$$

where K2 is a proportional control gain, I2 is an integral control gain, and e is the difference between the current pressure (FP) and the target pressure ($FP_T$) of the fuel supply line 20.

In one example embodiment, a final duty instruction that is given to the valve controller 60 to control the fuel supply valve 50 can be calculated as the sum of a feedback duty instruction (FB) (D=FB).

The feedback duty calculator 40 may apply a relatively small control gain value when a base duty instruction (BS) can be calculated rather than when the base duty instruction (BS) cannot be calculated.

In this case, the control gain value may include a proportional control gain, an integral control gain, etc. That is, the proportional control gain may be K2>>K1 and the integral control gain may be I2>>I1. This is because it is only required to compensate for the base duty instruction (BS) for K1 and I1.

The valve controller 60 can control opening and closing of the fuel supply valve 50 while limiting the sum of the base duty instruction (BS) calculated by the base duty calculator 30 and the feedback duty instruction (FB) calculated by the feedback duty calculator 40 within a predetermined duty limit range.

That is, the valve controller 60 can calculate the final duty instruction to control the fuel supply valve 50 based on the sum of a base duty instruction (BS) and a feedback duty instruction (FB) (D=BS+FB) and can control opening and closing of the fuel supply valve 50 based on the final duty instruction.

Further, the valve controller 60 can limit the sum of a base duty instruction (BS) and a feedback duty instruction (FB) (D=BS+FB) within a predetermined duty limit range.

Figure 3:
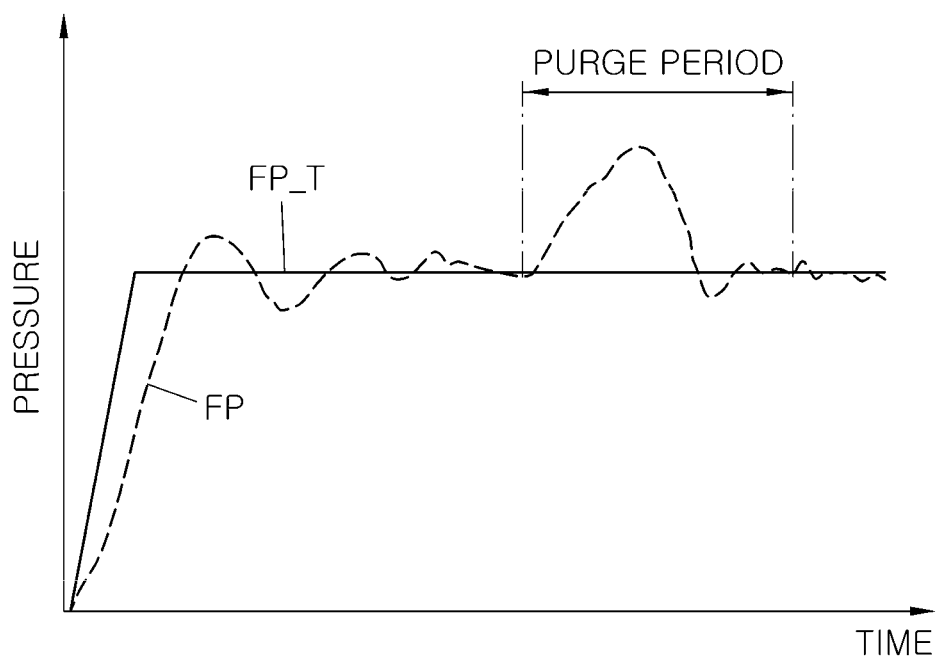
FIG. 3 is a time-pressure graph of a fuel supply line according to the related art.
Figure 4:
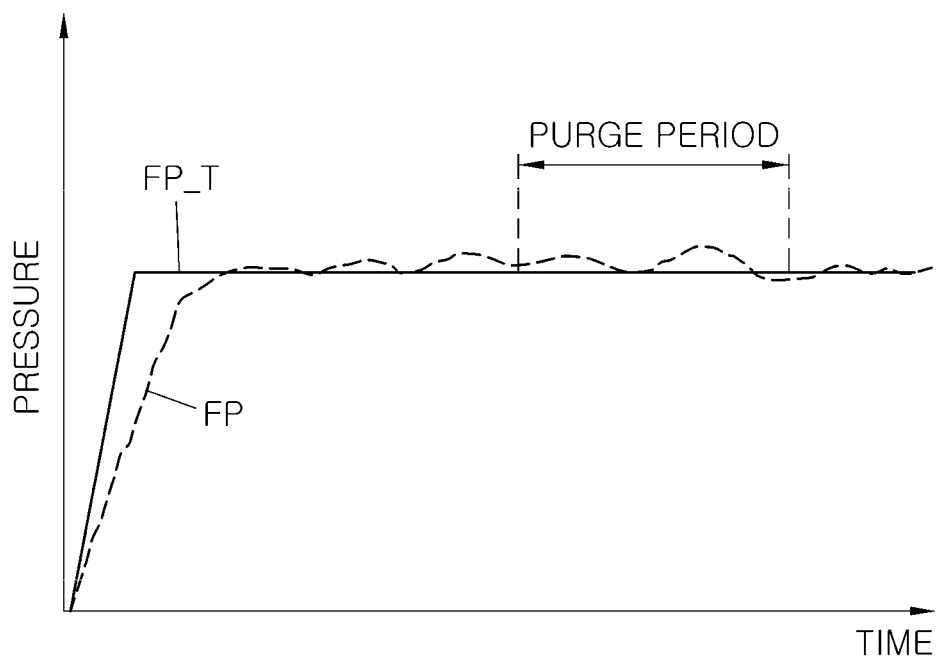
FIG. 4 is a time-pressure graph of a fuel supply line according to fuel supply control for a fuel cell according to an embodiment of the present disclosure.

FIG. 3 is a time-pressure graph of the fuel supply line 20 according to the related art, and FIG. 4 is a time-pressure graph of the fuel supply line 20 according to fuel supply control for the fuel cell 10 according to an embodiment of the present disclosure.

Fuel supply control of the related art is feedback control for compensating for the difference between the current pressure and the target pressure of the fuel supply line 20. According to this feedback control, as shown in FIG. 3, there is a problem that the pressure of the fuel supply line 20 shows large fluctuation when following the target pressure while varying with large amplitudes.

Further, there is a problem that an overshoot that is a large rise of the pressure of the fuel supply line 20 is generated in the purge period in which the purge valve is open. That is, according to the related art, there is a problem that the following performance of the pressure following the target pressure of the fuel supply line 20 is low.

On the other hand, according to the fuel supply control for the fuel cell 10 according to an embodiment of the present disclosure, as shown in FIG. 4, it can be seen that the amplitude that is changed when the pressure of the fuel supply line 20 follows the target pressure is greatly decreased.

Further, an overshoot that is a large rise of the pressure of the fuel supply line 20 is not generated even in the purge period in which the purge valve is open. That is, according to the present disclosure, there is an effect that the following performance of the pressure following the target pressure of the fuel supply line 20 is remarkably improved.

Figure 5:
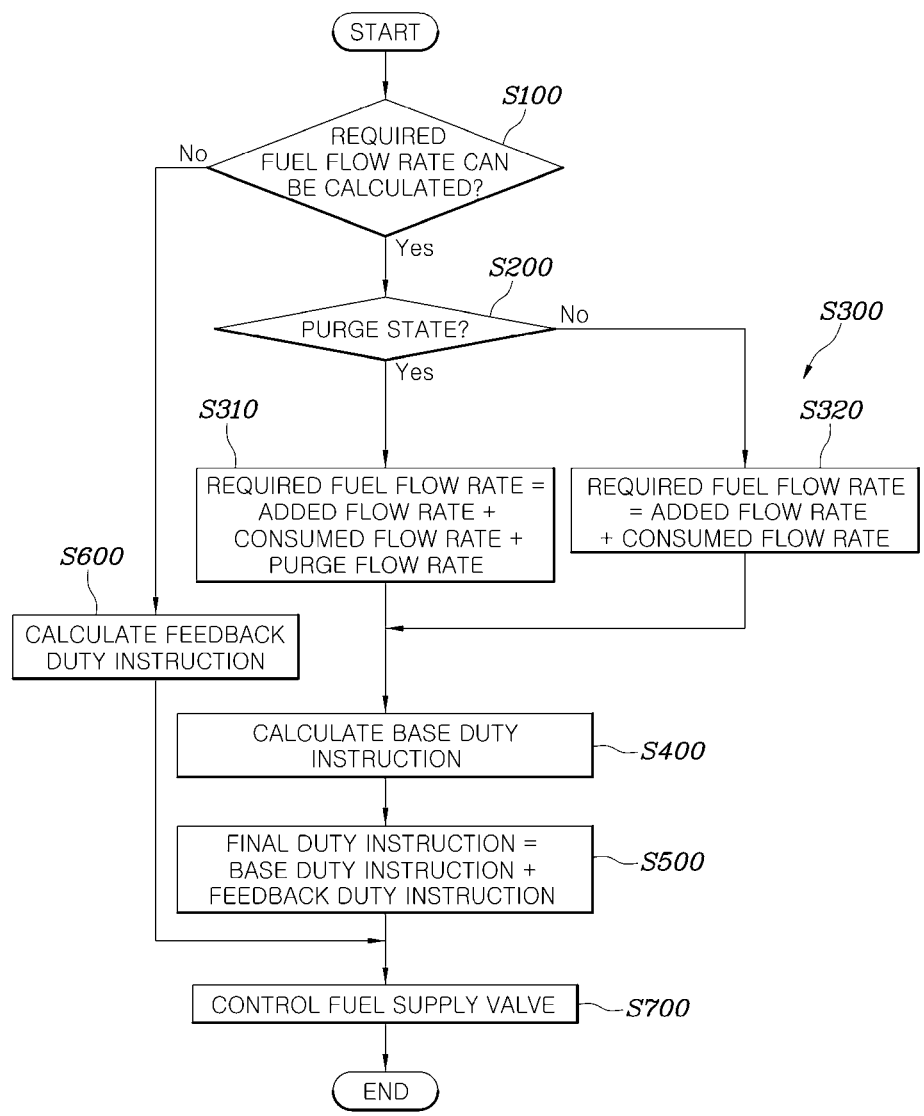
FIG. 5 is a flowchart of the fuel supply control method for a fuel cell according to an embodiment of the present disclosure.

FIG. 5 is a flowchart of the fuel supply control method for a fuel cell 10 according to an embodiment of the present disclosure.

Referring to FIG. 5, a fuel supply control method for a fuel cell 10 according to an embodiment of the present disclosure includes: estimating a required supply amount of a fuel gas required for a fuel supply line 20 connected an anode of a fuel cell 10 based on a power generation state of the fuel cell 10 (S300), calculating a base duty instruction to open a fuel supply valve 50, which allows a fuel gas kept in a fuel tank to be supplied to the fuel supply line 20 when being opened, based on the estimated required supply amount (S400), and controlling opening and closing of the fuel supply valve 50 based on the calculated base duty instruction (S700).

In the calculating of a base duty instruction (S400), the required supply amount of a fuel gas can be estimated based on the amount of a fuel gas that is consumed by the fuel cell 10 and an added amount according to a pressure change of the fuel supply line 20.

The method further includes estimating whether a purge valve, which allows a fuel gas in the fuel supply line 20 to be discharged outside when being opened, is open or is expected to be opened (S200) before the estimating of a required supply amount of a fuel gas (S300). In the estimating of a required supply amount of a fuel gas (S300), it is possible to estimate the required supply amount of a fuel gas based on the exhaust amount of a fuel gas, which is discharged outside from fuel supply line 20, calculated based on the pressure difference between the fuel supply line 20 and the outside when the purge valve is open or is expected to be opened (S310).

On the contrary, in the estimating of a required supply amount of a fuel gas (S300), it is possible to estimate the required supply amount of a fuel gas as the sum of the added amount and the consumed amount when the purge valve is not open or is not expected to be opened (S320).

The method further includes calculating a feedback duty instruction to compensate for the difference between the current pressure and the target pressure of the fuel supply line 20 (S500 and S600) before the controlling of opening and closing of the fuel supply valve 50 (S700). In the controlling of opening and closing of the fuel supply valve 50 (S700), it is possible to control opening and closing of the fuel supply valve 50 based on the calculated base duty instruction and feedback duty instruction.

The method further includes determining whether it is possible to calculate a base duty instruction based on whether it is possible to acquire power generation state data of the fuel cell 10 or state data of the fuel supply line 20 (S100). In the calculating of a feedback duty instruction (S500 and S600), it is possible to calculate a feedback duty instruction by applying different control gain values, depending on whether it is possible to calculate a base duty instruction.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:

1. A fuel supply control system for a fuel cell, comprising:
    a fuel cell configured to be separably supplied with a fuel gas and an oxidizing gas and to generate power;
    a fuel supply line configured to circulate a gas including a fuel gas therein and connected to an anode of the fuel cell;
    a fuel supply valve disposed between a fuel tank keeping a fuel gas therein and the fuel supply line and configured to allow the fuel gas in the fuel tank to be supplied to the fuel supply line when being opened;
    a first processor configured to estimate a required supply amount of a fuel gas required for the fuel supply line based on a power generation state of the fuel cell and to determine a base duty instruction to open the fuel supply valve based on the estimate required supply amount; and
    a valve controller configured to control opening and closing of the fuel supply valve based on the base duty instruction determined by the first processor;
    wherein the first processor estimates the required supply amount of a fuel gas based on the amount of a fuel gas that is consumed by the fuel cell and an added amount according to a pressure change of the fuel supply line.

2. The fuel supply control system of claim 1, wherein the first processor calculates the amount of a fuel gas that is consumed by the fuel cell as the amount of hydrogen required to generate an output current or a required current of the fuel cell.

3. The fuel supply control system of claim 1, wherein the first processor calculates the added amount according to a pressure change of the fuel supply line as the amount of hydrogen required to follow a target pressure at a present pressure of the fuel supply line based on temperature and volume of the fuel supply line.

4. The fuel supply control system of claim 1, further comprising a purge valve disposed in the fuel supply line and configured to allow the fuel gas in the fuel supply line to be discharged outside,
    wherein the first processor estimates the required supply amount of a fuel gas based on an exhaust amount of a fuel gas, which is discharged outside from the fuel supply line, calculated based on a pressure difference between the fuel supply line and the outside when the purge valve is opened or is expected to be opened.

5. The fuel supply control system of claim 1, further comprising a second processor configured to determine a feedback duty instruction to compensate for a difference between a current pressure and a target pressure of the fuel supply line,
    wherein the valve controller controls opening and closing of the fuel supply valve based on the base duty instruction determined by the first processor and the feedback duty instruction determined by the second processor.

6. The fuel supply control system of claim 5, wherein the second processor determines a feedback duty instruction to perform proportional integral control (PI control) on the difference between the current pressure and the target pressure of the fuel supply line.

7. The fuel supply control system of claim 5, wherein the base duty instruction determined by the first processor is determined based on whether it is possible to acquire power generation state data of the fuel cell or state data of the fuel supply line, and
    the second processor determines the feedback duty instruction by applying different control gain values, depending on whether it is possible to determine the base duty instruction.

8. The fuel supply control system of claim 7, wherein second processor applies a relatively small control gain value when the base duty instruction can be determined rather than when the base duty instruction cannot be determined.

9. The fuel supply control system of claim 5, wherein the valve controller controls opening and closing of the fuel supply valve while limiting the sum of the base duty instruction determined by the first processor and the feedback duty instruction determined by the second processor within a predetermined duty limit range.

10. A fuel supply control method for a fuel cell, comprising:
    estimating a required supply amount of a fuel gas required for a fuel supply line connected to an anode of a fuel cell based on a power generation state of the fuel cell;
    determining a base duty instruction to open a fuel supply valve, which allows a fuel gas kept in a fuel tank to be supplied to the fuel supply line when being opened, based on the estimated required supply amount; and
    controlling opening and closing of the fuel supply valve based on the determined base duty instruction;
    wherein, in the determining of a base duty instruction, the required supply amount of a fuel gas is estimated based on the amount of a fuel gas that is consumed by the fuel cell and an added amount according to a pressure change of the fuel supply line.

11. The fuel supply control method of claim 10, further comprising estimating whether a purge valve, which allows a fuel gas in the fuel supply line to be discharged outside when being opened, is open or is expected to be opened, before the estimating of a required supply amount of a fuel gas,
    wherein, in the estimating of a required supply amount of a fuel gas, the required supply amount of a fuel gas is estimated based on an exhaust amount of a fuel gas, which is discharged outside from fuel supply line, calculated based on a pressure difference between the fuel supply line and the outside when the purge valve is open or is expected to be opened.

12. The fuel supply control method of claim 10, further comprising determining a feedback duty instruction to compensate for a difference between a current pressure and a target pressure of the fuel supply line, before the controlling of opening and closing of the fuel supply valve,
    wherein, in the controlling of opening and closing of the fuel supply valve, opening and closing of the fuel supply valve are controlled based on the determined base duty instruction and feedback duty instruction.

13. The fuel supply control method of claim 12, wherein the determining the base duty instruction is determined based on whether it is possible to acquire power generation state data of the fuel cell or state data of the fuel supply line, before the determining of a feedback duty instruction, wherein, in the determining of a feedback duty instruction, the feedback duty instruction is determined by applying different control gain values, depending on whether it is possible to determine the base duty instruction.

* * * * *